United States Patent Office 3,579,400
Patented May 18, 1971

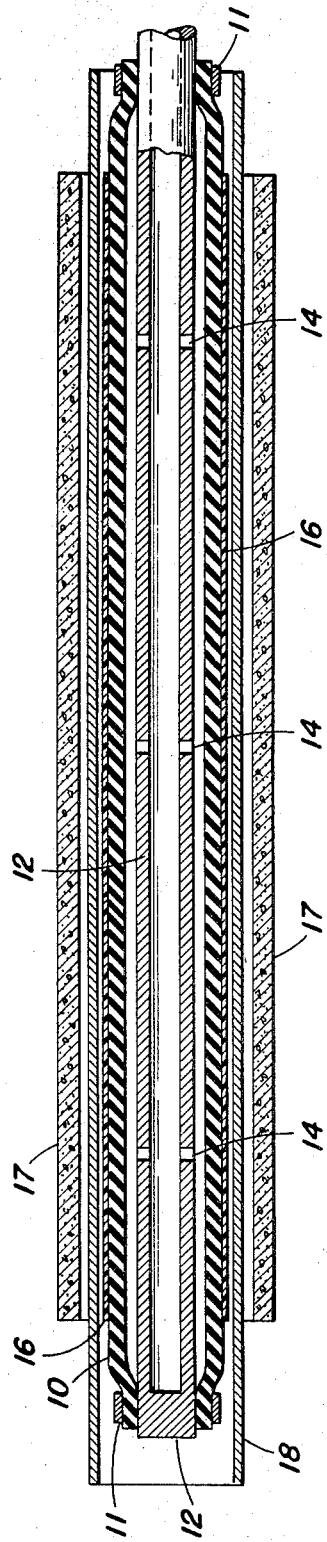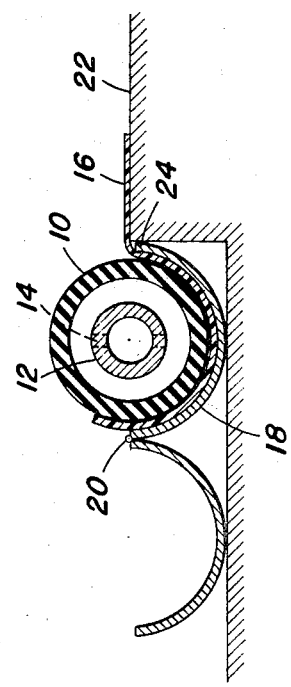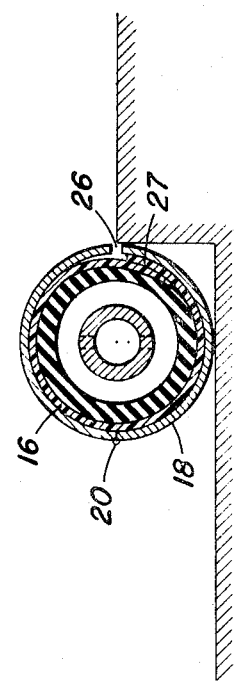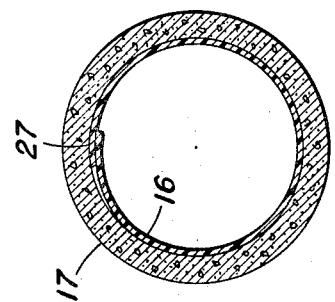
INVENTORS
William H. Keller
Anthony J. Kanyon
BY
ATTORNEY

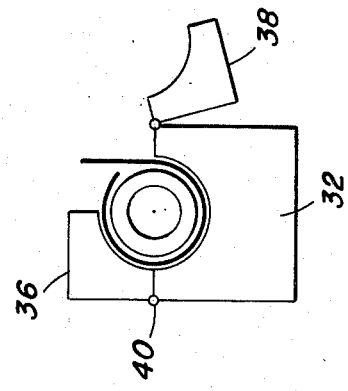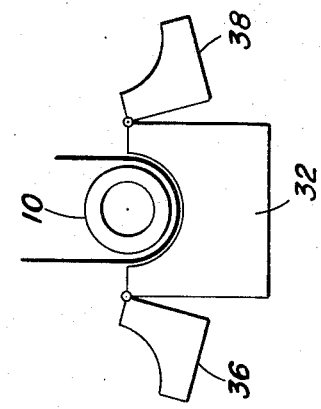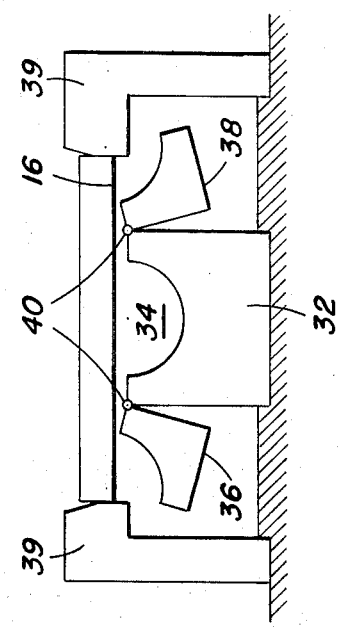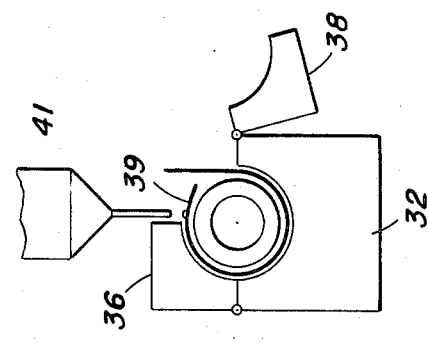

---

3,579,400
METHOD OF POSITIONING A MEMBRANE
Anthony J. Kanyok, East Hanover, and William H. Keller, New Brunswick, N.J., assignors to American Standard Inc., New York, N.Y.
Continuation of application Ser. No. 640,304, May 22, 1967. This application Dec. 8, 1969, Ser. No. 880,465
Int. Cl. B29c *19/00*
U.S. Cl. 156—294        4 Claims

ABSTRACT OF THE DISCLOSURE

A resilient filtration membrane is inserted in a porous support tube by wrapping the membrane around a resilient tubular member, and holding the membrane in place around the tubular member while inserting the membrane and resilient tubular member into the porous support tube. The resilient member is expanded under fluid pressure and then returned to its normal state leaving the membrane against the interior wall of the porous support.

---

This application is a continuation of my earlier copending application Ser. No. 640,304 filed May 22, 1967, now abandoned.

This invention relates to a method and apparatus employed in assembling an ultra-filtration membrane in a porous support tube of the type used in water desalination systems where an osmotic membrane is used to separate the solute from solution. This type of ultra-filtration system is described in copending applications Ser. No. 508,052 filed Nov. 16, 1965, now abandoned; Ser. No. 508,037 filed Nov. 16, 1965, now abandoned and Ser. No. 567,304 filed July 22, 1966, now Pat. No. 3,425,562, all of which applications were assigned to the assignee of the present application.

In accordance with the present invention a flat strip of resilient osmotic membrane is formed into a tube by wrapping the membrane around a resilient tubular member. The resilient tubular member with the membrane held in place thereon is then positioned inside a porous support tube. Fluid under pressure is supplied to the interior of the resilient tubular member to cause it to expand and move the osmotic tublular membrane out against the inside wall of the porous support tube. Fluid pressure in the resilient tubular member is then released whereupon the member contracts and is removed from the porous tube. The osmotic tube remains in place against the inside wall of the support tube due to the resiliency of the osmotic membrane which urges it to press outwardly against the wall as it seeks to return to its original form of a flat strip.

One preferred form of apparatus used in carrying out the present invention is illustrated in the drawings in which:

FIG. 1 is an end view of a resilient tubular member in position in an outer split tube which can be used to assist in wrapping the membrane in place around the exterior of the tubular member.

FIG. 2 illustrates the way in which the outer split tube may be used to hold the tube of osmotic membrane in place on the resilient tubular member.

FIG. 3 is a sectional view of the apparatus of FIG. 2 as it appears in position in a porous support tube.

FIGS. 4A–F illustrate a modified form of apparatus which may be used to assist in wrapping the osmotic membrane on the resilient tubular member.

FIG. 5 is a cross sectional view showing the osmotic membrane in place in the porous support tube.

The device for inserting an osmotic tube into a porous support illustrated in the drawings comprises a resilient tube 10 most conveniently made of an elastomer such as rubber. In the preferred form of structure shown the resilient tube 10 is provided with an inner tube 12 that is closed at one end so that fluid under pressure may be supplied inside the resilient tube by means of a plurality of opening 14. Both of the open ends of the resilient inserter tube 10 are closed as by clamps 11 which press the ends of the member against tube 12 to provide a seal against fluid pressure generated inside the resilient tube. The inner tube 12 is preferably made of metal in order to stiffen the assembly.

The resilient osmotic membrane 16 to which this invention particularly relates is a thin film only a few thousandths of an inch thick. The resilient membrane 16 may be made of cellulose acetate as shown or as is known of polyvinyl alcohol, cellulose isobutyrate, polyvinyl acetate, polyvinyl methyl ketone, ethyl cellulose, cellulose, nylon 6, amylose triacetate, methyl carbonate and ethyl carbonate. When used in conventional manner in water desalination systems the film is formed into a tube which can be of a desired length. Lengths on the order of from two to ten feet have been found to produce the desired results. The tube is provided with an exterior porous support such as a woven reinforced glass fiber tube 17 that so supports the film as to enable it to withstand the pressure generated during operation of the system. The osmotic film is supplied in flat strips which in accordance with the present invention are wrapped around the resilient inserter 10 and held in the form of a tube which is then positioned in the tubular porous support 17.

FIG. 1 illustrates one convenient way in which the osmotic membrane may be wrapped around the resilient inserter to form a tube. As there shown, one end portion of the wet membrane 16 is positioned in the bottom half of a split metal tube 18 which is hinged in any convenient manner as at 20. The remaining second end portion of the membrane rests on the surface of an elevated platform 22 which is positioned adjacent to the lip 24 of the bottom half of the split tube 18. The resilient inserter 10 is placed in position on top of membrane 16 in the bottom half of the split tube and then the top half of the metal tube is closed over on top of the inserter. The hinges of the split metal tube are so arranged that an open feed slit 26 is provided between the lips of the split tube adjacent the edge of the elevated platform 22. The resilient inserter tube is then rotated in clockwise direction as illustrated in FIG. 2 and the osmotic membrane is thereby wrapped around the exterior of the inserter to form a tube. In the preferred form of structure shown the end portions of the osmotic membrane are overlapped as illustrated at 27 in FIG. 2.

The split metal tube 18 may be used to hold the tubular osmotic membrane 16 in place on the inserter and if this is done the assembly formed in FIG. 2 is then inserted into the porous support tube 17 as shown in FIG. 3. The split metal tube 18 is then removed from the support tube by sliding it out from one end of the porous tube. Thereafter fluid pressure is generated inside the resilient inserter tube 10 as by supplying air or water under pressure inside the tube by means of the plurality of openings in the inner tube 12 which causes the resilient inserter tube to expand and press the osmotic membrane out against the interior wall of the porous support. Pressing the osmotic membrance outwardly against the interior wall of the support tube increases the inside diameter of the tubular membrane. The overlapped end portions of the osmotic membrane are free to slide relative to one another to supply the material required for increasing the diameter of the tube. The overlapped portion is made wide enough to leave at least a small overlap along the length of the osmotic tube after it is fully expanded against the inside wall of the porous support. Fluid pressure inside the resilient inserter is released and the inserter thereby contracts to move away from the osmotic tube which remains in position against the inside wall of the porous support tube due to the resiliency of the osmotic membrane which urges it to spring back to its initial form. In use in a water desalination system, salt water is fed into the interior of the osmotic tube and the pressure of the water will be sufficient to press the overlapped end portions of the osmotic membrane so tightly together that a water tight seam is formed in the osmotic tube.

In some instances, it may be desirable to employ an adhesive in the above system. This is done by sealing the overlapped end portions of the osmotic tube by means of a suitable adhesive such as aqueous polyvinyl alcohol, Pliobond (Goodyear Tire and Rubber Company) or Super Cement (Du Pont Company). Any of the conventional adhesives known in the art may of course be used. The adhesive may be most conveniently applied to one end portion of the osmotic membrane before it is overlapped to form the tube on the inserter. For example, the adhesive may be applied to the flat end portion of the membrane when in the position illustrated in FIG. 1. The adhesive forms a temporary bond strong enough to hold the osmotic tube in position on the inserter so that the split metal tube 18 may be removed from the assembly of FIG. 2 and only the inserter and osmotic membrane tube need then be inserted into the porous support tube. The fluid pressure generated inside inserter 10 will have sufficient force to overcome the temporary bond and expand the osmotic tube out against the inside wall of the support. Enough adhesive is applied to cover the overlapped end portions in the fully expanded tube and after the osmotic tube is in position in the porous support the adhesive will form a water tight seam in the tube.

In some applications it may not be necessary to overlap the end portions of the osmotic membrane. In such case the membrane may be cut to the size required to have the edges of the membrane in abutting relationship in the fully expanded tube in the porous support. A separate strip may be used to seal the osmotic tube or the porous support may be so made as to provide the seal for the osmotic tube as by spreading a waterproof adhesive in a line down the inside of the porous tube where it will overlap adjacent edges of the osmotic tube.

A modified form of apparatus which may be used to wrap the osmotic membrane around the resilient inserter is illustrated in FIGS. 4A through F. As there shown, the apparatus consists of a base member 32 having a generally shaped semicircular opening 34 therein which runs throughout the entire length of the member. The semicircular cover for the base is divided in half to form a first cover member 36 and a second cover member 38 and each one of the cover members pivotably mounted by suitable hinges as at 40 so that each member can be positioned down below the top of the base as shown in FIG. 4F and then rotated upwardly into the position shown in FIG. 4F.

In use the cover members 36 and 38 are moved into the position shown in FIG. 4A and then an osmotic membrane 16 is placed across the top of the semicircular opening in the base member and centered thereon by means of the guides 39. The resilient tubular inserter 10 is lowered down on top of the membrane which thereupon takes the generally U shaped form illustrated in FIG. 4B. One of the cover members 36 is then moved clockwise to contact one leg of the membrane and wrap it around the tubular inserter 10 as shown in FIG. 4C. The osmotic membrane is so arranged on the base member that one end portion 39 of the osmotic membrane extends out beyond the end of the cover member 36 when in closed position on top of the membrane. Adhesive is applied to the exposed end portion 39 of the osmotic membrane as by means of a suitable dispenser 41 as illustrated in FIG 4D. The second cover member 38 is thereafter moved counter-clockwise to contact the second leg of the osmotic membrane and wrap it around the tubular inserter 10 as illustrated in FIG. 4F. The arrangement and width of the osmotic membrane is such that a strip along the end portion of the second leg of the membrane will overlap the exposed end portion of the first leg with the edges of the second leg in position adjacent the end of cover member 36. The adhesive forms a bond that holds the tubular osmotic membrane in place around the resilient inserter 10 which may now be removed from the membrane forming apparatus and inserted with the membrane in place thereon into the porous support tube 17. Fluid under pressure is supplied inside the resilient inserter 10 to cause it to expand and press the osmotic membrane out against the inside wall of the support tube. Fluid pressure is then released and the resilient inserter 10 contracts and is removed from the tubular membrane which remains in position against the wall of the porous tube. The adhesive will form a bond in the overlapped seam of the osmotic membrane as previously described hereinabove. Various other methods for wrapping the osmotic membrane in place around the inserter tube will be obvious to those skilled in the art.

It will be understood that it is intended to cover all changes and modifications of the preferred embodiments of the invention, herein chosen for the purpose of illustration, which do not depart from the spirit and scope of the invention.

What is claimed is:

1. The method of positioning a resilient ultrafiltration membrane inside a porous support by means of a resilient tubular member which comprises the steps of wrapping the resilient ultrafiltration membrane around the resilient tubular member, holding the membrane in place around the resilient tubular member while inserting the membrane and resilient tubular member into the porous support tube, generating fluid pressure within a stationary perforated tube which is located inside the resilient member to cause said resilient member to expand and move the membrane out against the interior wall of the porous support, releasing the fluid pressure to cause the resilient member to contract and then removing the resilient member from the porous support tube, said support tube with said membrane now ready for use in an ultrafiltration system.

2. A method as specified in claim 1 which includes the step of overlapping the end portions of the ultrafiltration membrane when it is wrapped around the resilient tubular member.

3. A method as specified in claim 2 which includes the step of applying adhesive to the overlapped end portions of the membrane to form at least a temporary bond to hold the membrane in place on the resilient tubular member for insertion in the porous support tube.

4. A method as specified in claim 1 in which air pressure is generated inside the resilient tubular member to cause it to expand.

References Cited

UNITED STATES PATENTS

| | | | |
|---|---|---|---|
| 2,664,373 | 12/1953 | Reilly | 264—88 |
| 2,695,255 | 11/1954 | Avery | 18—19 |
| 2,956,070 | 10/1960 | Jennings et al. | 210—22X |
| 3,162,895 | 12/1964 | Pusch | 18—19 |
| 3,322,157 | 5/1967 | Mitchell | 264—94X |

FOREIGN PATENTS

| | | | |
|---|---|---|---|
| 1,459,565 | 10/1966 | France | 18—19 |

REUBEN FRIEDMAN, Primary Examiner

T. A. GRANGER, Assistant Examiner

U.S. Cl. X.R.

210—321; 264—269, 314